US012761079B2

(12) United States Patent
Druart et al.

(10) Patent No.: US 12,761,079 B2
(45) Date of Patent: Oct. 13, 2026

(54) OPTICAL IMAGING SYSTEM WITH MULTIPLE PATHS ARRANGED IN PARALLEL AND A COMMON ENTRANCE APERTURE

(71) Applicant: OFFICE NATIONAL D'ETUDES ET DE RECHERCHES AÉROSPATIALES, Palaiseau (FR)

(72) Inventors: Guillaume Druart, Palaiseau (FR); Roland Domel, Palaiseau (FR); Adrien Mas, Montigny le Bretonneux (FR); Eric Compain, Montigny le Bretonneux (FR); Sylvain Favier, Montigny le Bretonneux (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 296 days.

(21) Appl. No.: 18/719,533

(22) PCT Filed: Nov. 29, 2022

(86) PCT No.: PCT/EP2022/083682

§ 371 (c)(1),
(2) Date: Jun. 13, 2024

(87) PCT Pub. No.: WO2023/110391

PCT Pub. Date: Jun. 22, 2023

(65) Prior Publication Data

US 2026/0168851 A1 Jun. 18, 2026

(30) Foreign Application Priority Data

Dec. 14, 2021 (FR) ...................................... 2113519

(51) Int. Cl.
*G01J 3/02* (2006.01)
*G01J 3/12* (2006.01)
(Continued)

(52) U.S. Cl.
CPC ........... *G01J 3/0286* (2013.01); *G01J 3/0202* (2013.01); *G01J 3/0208* (2013.01); *G01J 3/0229* (2013.01);
(Continued)

(58) Field of Classification Search
CPC ..................................................... G01J 3/0286
See application file for complete search history.

(56) References Cited

U.S. PATENT DOCUMENTS 10,375,327 B2 8/2019 Kester
2018/0191967 A1 7/2018 Kester
(Continued)

FOREIGN PATENT DOCUMENTS

FR 3094792 A1 10/2020

OTHER PUBLICATIONS

International Search Report on Patentability issued on Feb. 27, 2023, corresponding International Application No. PCT/EP2022/083682, 2 pages.
(Continued)

*Primary Examiner* — Y Lee
(74) *Attorney, Agent, or Firm* — Maier & Maier, PLLC

(57) ABSTRACT

An optical imaging system which includes multiple optical paths arranged in parallel, and which is athermalized. It is further suitable for preventing image overlap occurring inside useful areas of a matrix image sensor that is common to the optical paths. A thermal compensation device for effecting the athermalization is also used to support a baffle which removes image overlap in the useful areas.

11 Claims, 5 Drawing Sheets

(51) Int. Cl.
*G01J 3/28* (2006.01)
*G01J 3/42* (2006.01)

(52) U.S. Cl.
CPC ............... *G01J 3/12* (2013.01); *G01J 3/2803* (2013.01); *G01J 3/2823* (2013.01); *G01J 3/42* (2013.01); *G01J 2003/1213* (2013.01); *G01J 2003/2826* (2013.01)

(56) References Cited

U.S. PATENT DOCUMENTS

| | | | | |
|---|---|---|---|---|
| 2021/0344851 | A1 | 11/2021 | Kester et al. | |
| 2024/0385037 | A1* | 11/2024 | Carr | G01J 3/0202 |
| 2024/0385105 | A1* | 11/2024 | Araki | G01J 3/0202 |
| 2026/0098758 | A1* | 4/2026 | Mano | G01J 3/0286 |

OTHER PUBLICATIONS

Tanida et al, "Thin Observation Module by Bound Optics (TOMBO): Concept and Experimental Verification", Applied Optics, Optical Society of America, Apr. 10, 2001, vol. 40, No. 11, 8 pages.
Preliminary Search Report issued on Jul. 25, 2022, in corresponding French Application No. 2113519, 5 pages.

* cited by examiner

OPTICAL IMAGING SYSTEM WITH MULTIPLE PATHS ARRANGED IN PARALLEL AND A COMMON ENTRANCE APERTURE

TECHNICAL FIELD

This description relates to an optical imaging system with several pathways which are arranged in parallel and with an input aperture common to all these pathways. It also relates to a method for capturing several images which are associated with an input optical field which is the same for all these images.

BACKGROUND

Many fields require the detection of the presence of a specific gas in a scene, which gas may be invisible. For example, such gas detection is useful in industry when the gas is toxic or polluting, and/or to search for the possible presence of a gas leak in facilities for transferring or using this gas. In particular, it is thus often useful to detect presence of a hydrocarbon gas in industrial facilities. The detection of gas in a scene is also useful for military applications, especially to search for the possible presence of combat gas in an intervention zone.

In general, gases concerned have characteristic absorption bands in the spectral range between 3 μm (micrometre) and 5 μm, commonly designated the Medium Wave InfraRed (MWIR) range, or between 8 μm and 14 μm, commonly designated the Long-Wave InfraRed (LWIR) range. Optical imaging systems incorporating germanium (Ge)-based lenses are then often used to optically detect the gas, but other materials that are also transparent in the desired spectral range can be used alternatively for such systems. However, these materials, including germanium, have optical properties that greatly vary depending on the thermal course of the environment. It is therefore known to use thermal compensation devices, also known as athermalisation devices, to ensure that the images captured remain sharp regardless of the system operating temperature inside a prescribed thermal interval.

Furthermore, it is also known to equip an optical imaging system with a baffle. The usual function of such a baffle is to eliminate stray light which would otherwise enter the optical imaging system at incidences that are very tilted with respect to the optical axis of the system, without participating in forming images.

Furthermore, the selective detection of a gas requires the implementation of several optical pathways in parallel in the optical imaging system which is used, these optical pathways being functional in spectral windows that are different from one optical pathway to another. It is thus possible to identify the gas or family of gases present in the scene on the basis of its image rendition for all the spectral windows. However, the challenge is to have multiple-pathway optical imaging systems that are of low overall size, lightweight and easy to manufacture, especially when it comes to aligning their optical components, and that can operate over sufficiently wide operating temperature intervals.

An architecture that offers many advantages for such optical imaging systems is described in the paper by J. Tanida et al, entitled "Thin observation module by bound optics (TOMBO): concept and experimental verification", Appl. Opt. vol. 40, pp. 1806-1813 (2001). Such a TOMBO system comprises:

a matrix image sensor; and an imaging matrix, comprising several imaging optics which are disposed in parallel and adapted to form simultaneously, in useful zones of the matrix image sensor which are dedicated one-to-one to the imaging optics, respective images of a scene contained in an input optical field which is identical for all such imaging optics, the useful zones of the matrix image sensor being disjoint and each imaging optic with the corresponding useful zone belonging to one of the optical pathways of the system separately from each other optical pathway.

To avoid an image that is intended to be captured in one of the useful zones overflowing beyond the peripheral limit of this useful zone into a neighbouring useful zone, it is known to use separating walls between the optical pathways. Document U.S. Pat. No. 10,375,327 B2, or US 2018/0191967 A1, describes such TOMBO systems with separating walls between neighbouring optical pathways, for the application of gas detection. Such separating walls, which are opaque and commonly referred to as low walls, are longitudinally disposed between neighbouring optical pathways at the imaging matrix and extend up to the matrix image sensor. However, they have the following drawbacks:

when these dividing walls extend through the entire imaging matrix, the lenses thereof can no longer be made as one-piece lens matrices, and because of this, alignments have to be made optical pathway by optical pathway, which is tedious and complex, and increases the cost price of the system to a significant extent; and such dividing walls are most effective in preventing image overlap between neighbouring optical pathways when they extend close or very close to the surface of the matrix image sensor. However, for the MWIR and LWIR spectral ranges, the matrix image sensor is contained in a reduced-pressure enclosure, so that a window in this enclosure is necessarily present between the imaging matrix and the matrix image sensor. For this reason, the separating walls end at the window, and therefore at a distance from the matrix image sensor, and because of this their effectiveness in avoiding image overlaps between neighbouring optical pathways is insufficient.

Also, in order to avoid such image overlaps within each useful zone, such as resulting from the overflow of each image beyond the peripheral limit of the useful zone which dedicated to this image, it is known to provide clearance bands between neighbouring useful zones within the matrix image sensor. These clearance bands are dimensioned so that each overflow of any of the images in one of the clearance bands towards a neighbouring useful zone is shorter than a width of this clearance band, for any value of the system temperature in the prescription interval. In general, the useful zones are determined by reading selections of the matrix image sensor during each image capture sequence, restricted to those of the photodetectors that belong to one of the useful zones. But such clearance bands lead to under-use of the image sensor.

Still to limit or eliminate overlaps between images formed by neighbouring optical pathways, it is possible to laterally space the optical pathways apart from one another. However, this again results in under-use of the image sensor.

Finally, increasing the distance between the imaging matrix and the matrix image sensor to reduce overlap between images formed by neighbouring optical pathways prevents the system from being compact. However, there is a major need for such optical imaging systems to be compact, for example to be easily transportable by an operator or by an autonomous vehicle, especially a drone, or even to be mounted to a steerable turret.

Given this situation, one purpose of the present invention is to provide an athermalised TOMBO system in which image overlaps are eliminated in all the useful zones of the matrix image sensor.

Related purposes of the invention are that the system is of low overall size, not heavy and easy to manufacture, especially as regards the alignment of its optical components, and that it should have a wide field of view with a large aperture. Indeed, the wide field of view makes it possible to detect a leak inside a scene that is laterally extended, and the large aperture makes it possible to increase the signal-to-noise ratio of the images which are captured.

SUMMARY

To achieve at least one of these purposes or another one, a first aspect of the invention provides a new optical imaging system with several optical pathways arranged in parallel, of the TOMBO system type as aforesaid. It therefore comprises a matrix image sensor and an imaging matrix according to the aforementioned arrangement. The optical imaging system of the invention further comprises:

- a thermal compensation device, disposed to produce a variable spacing between the imaging matrix and the matrix image sensor, and comprising, in at least one longitudinal cross-sectional plane which is perpendicular to the imaging matrix and to the matrix image sensor, a meander comprised of two segments each at least partly consisting of a material whose thermal expansion coefficient value is different from that for the other segment, the two segments being connected to each other by respective distal ends thereof, a proximal end of one of the segments being connected to the imaging matrix and a proximal end of the other of the segments being connected to the matrix image sensor, a difference between the thermal expansion coefficient values and respective lengths of the two segments being adapted to produce the variable spacing between the imaging matrix and the matrix image sensor so that images which are formed in the useful zones of the matrix image sensor are sharp when the temperature of the system has any value inside the prescription interval; and
- a baffle, disposed upstream of the imaging matrix with respect to a direction of propagation of a radiation that enters the system to form images, the baffle having an aperture for the radiation that is common to the optical pathways of the system.

According to a first additional characteristic of the invention, the aperture of the baffle is dimensioned to laterally limit lighting in each image that is formed by any of the optical pathways, referred to as the optical pathway under consideration, in order to avoid this image overflowing into the useful zone of another of the optical pathways, next to the optical pathway under consideration. In this way, any image overlap is prevented in all the useful zones, for any value of the system temperature in the prescription interval.

According to a second additional characteristic of the invention, the distal ends of the segments of the thermal compensation device are located upstream of the imaging matrix with respect to the direction of propagation of the radiation entering the system to form images. Furthermore, the baffle is supported by the thermal compensation device upstream of the imaging matrix, again with respect to the direction of propagation of the radiation entering the system to form images. Preferably, the baffle can be supported by the thermal compensation device at the distal ends of the segments of this thermal compensation device.

Thus, the baffle is supported by the thermal compensation device. In other words, the invention provides a combination of two functions for the thermal compensation device. The first function consists in adapting the distance between the imaging matrix and the matrix image sensor in accordance with variations in the optical characteristics of the imaging matrix, essentially its focal length, as a function of temperature. In this way, images captured by the matrix image sensor remain sharp throughout the prescription interval, which can be large. The second function of the thermal compensation device is to support the baffle. This combination of functions is particularly effective in achieving a compact system. In particular, the additional function of supporting the baffle, introduced by the invention, does not necessarily make it necessary to lengthen the meander of the thermal compensation device, compared with its length required for the athermalisation function. According to the invention, the respective materials of the two segments of the thermal compensation device are chosen to produce the athermalisation function and also to support the baffle at a position that eliminates image overlaps in the useful zones of the matrix image sensor.

By virtue of the invention, the use of separating walls between the optical pathways is no longer essential. The imaging matrix can then be made up of one-piece lens matrices, so that optical alignment of the whole system is simple.

Also, by virtue of the absence of separating walls, a window can be inserted between the imaging matrix and the matrix image sensor, especially a reduced-pressure enclosure window when the image sensor requires such an enclosure for its operation.

Generally speaking, when those useful zones which are aligned between two opposite edges of the matrix image sensor are progressively counted from one of these edges, the aperture of the baffle and the distance between this baffle and the imaging matrix can be dimensioned so that the overflow into the clearance band, which is intermediate between the first and second useful zones, of the image corresponding to the second useful zone is limited by the baffle so as to stop at a boundary between the clearance band and the first useful zone. Alternatively, the aperture of the baffle and the distance between this baffle and the imaging matrix can be dimensioned so that the overflow in the clearance band, which is intermediate between the first and second useful zones, of the image corresponding to the first useful zone is limited by the baffle so as to stop at a boundary between the clearance band and the second useful zone. This is a condition of non-overlap between images of neighbouring optical pathways, expressed for the clearance band which is the laterally outermost clearance band.

In preferred embodiments of the invention, at least one of the following additional characteristics may optionally be reproduced, alone or in combination of several of them:

- a separation distance between the baffle and the imaging matrix, measured in parallel to a common direction of respective optical axes of the imaging optics, may be between 1.0 times and 6.0 times a mean value of the focal lengths of the imaging optics;
- the optical imaging system may further comprise an enclosure which is disposed to contain the matrix image sensor, this enclosure being provided with a window which is transparent to the imaging radiation, and which is located between the imaging matrix and the matrix image sensor;

the imaging optics can have a row and column arrangement in the imaging matrix, each row being perpendicular to each column, and the imaging matrix can then be oriented so that each row of imaging optics is parallel to a row or column direction of photodetectors of the matrix image sensor;

the row and column arrangement of the imaging optics in the imaging matrix can be of one of the following dimensions: 1×2, 2×1, 2×2, 2×3, 3×2, 3×3, 2×4, 4×2, 3×4, 4×3 and 4×4. However, a limited number of optical pathways may be preferred, so as not to require clearance bands which are too wide when they are widely offset with respect to a central optical axis of the imaging matrix;

when the row and column arrangement of the imaging matrix comprises at least three imaging optics that are aligned along a row or column direction, then any two of the clearance bands that are parallel to each other may have widths that are identical;

each imaging optic may comprise at least one germanium-based lens;

the imaging matrix may comprise one-piece lens matrices;

each imaging optic may comprise a spectral filter, and the spectral filters of two of the imaging optics that are distinct in the imaging matrix may determine spectral transmission windows that are different;

the spectral filter of each imaging optic can be located between two lenses of this imaging optic, especially to avoid spurious images that would result from multiple reflections between this spectral filter and the matrix image sensor, and to avoid increasing the distance between the imaging matrix and the matrix image sensor;

the aperture number, commonly noted F #, of each optical pathway of the optical imaging system can be between 0.9 and 1.5, corresponding to large values of pupil diameter. Such aperture values, combined with the fact that the diameter of the optics have to be less than or equal to the individual size of their image zones allocated on the detector in accordance with the TOMBO architecture, can advantageously be obtained by using materials with high refractive index values, such as germanium. However, these materials generally have a higher thermal sensitivity than materials with lower refractive index values, such as chalcogenide glasses. The thermal compensation device provided by the invention is therefore even more advantageous;

the useful field of view, commonly known as the FOV, of each optical pathway may be between 20° (degree) and 60°, corresponding to wide or very wide fields of view; and the prescription thermal interval can have a length greater than or equal to 60° C. (degrees Celsius), preferably greater than or equal to 80° C. Generally speaking, the thermal prescription interval is written on the optical imaging system, or may be indicated in a hardware or electronic manual supplied with this system.

A second aspect of the invention provides a method for capturing multiple images associated with an input field of view that is identical for all such images, this method being implemented using an optical imaging system that is in accordance with the first aspect of the invention.

Such a method may be intended to reveal presence of a gas within the input field of view. In this case, each optical pathway is provided with a spectral filter as indicated above, and the spectral filters can advantageously be selected so that the spectral transmission window of at least one of the spectral filters is in a transparency band of the gas, and the spectral transmission window of at least one other of the spectral filters is in an absorption band of the gas.

In particular, the gas sought by such a method may be natural gas, a hydrocarbon gas, a toxic gas, for example hydrogen sulphide ($H_2S$) or carbon monoxide (CO), or a greenhouse gas, especially carbon dioxide ($CO_2$).

BRIEF DESCRIPTION OF THE FIGURES

The characteristics and advantages of the present invention will become clearer in the following detailed description of non-limiting exemplary embodiments, with reference to the appended figures, among which.

DETAILED DESCRIPTION

For the sake of clarity, dimensions of the elements that are represented in these figures correspond neither to actual dimensions nor to actual dimension ratios. Furthermore, some of these elements are represented only symbolically, and identical references which are indicated in different figures designate elements which are identical or which have identical functions.

The embodiment of the invention now described with reference to [FIG. 1]-[FIG. 4] includes a 2×3 matrix of juxtaposed optical pathways. Reference 2 overall designates this matrix of optical pathways, which has been referred to as an imaging matrix in the general part of this description.

Figure 1:
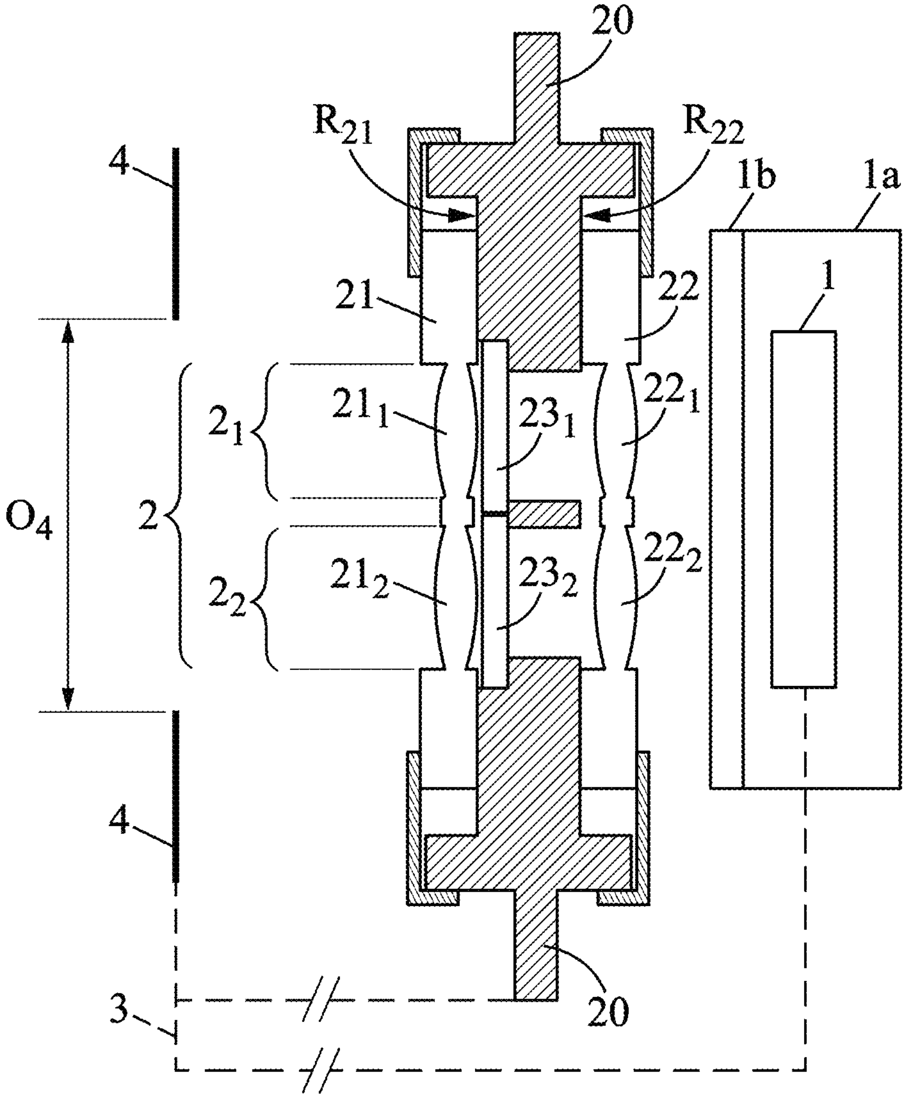
FIG. 1 is a cross-section view of part of an optical imaging system in accordance with the invention.

[FIG. 1] shows the following elements of the optical imaging system:

a matrix image sensor, which is designated by reference 1;

two of the optical pathways, which are juxtaposed and designated by references 21 and 22, respectively;

the mechanical connection between the matrix image sensor 1 and the imaging matrix 2, which is symbolically represented by dashed lines and consists of a thermal compensation device 3; and a baffle 4.

The matrix image sensor 1 may be of the bolometer or microbolometer type, disposed in a matrix of rows and columns, for example 1024 columns by 768 rows. Advantageously, it can be of an operational type without a cooling system. This matrix image sensor 1 is contained in a reduced-pressure enclosure 1*a*, the latter being provided with a window 1*b* which is transparent to the radiation intended to be detected by the matrix image sensor 1. For example, and especially for gas detection applications, the spectral sensitivity range of the matrix image sensor 1 may comprise at least one of the following two wavelength intervals: 3 μm-5 μm and 8 μm-14 μm.

In such an embodiment, all the optical pathways may have constitutions that are similar, and each optical pathway may comprise two lenses and a spectral filter. Thus, optical pathway $\mathbf{2}_1$ may comprise lenses $\mathbf{21}_1$ and $\mathbf{22}_1$, as well as spectral filter $\mathbf{23}_1$, and optical pathway $\mathbf{2}_2$ may comprise lenses $\mathbf{21}_2$ and $\mathbf{22}_2$, as well as spectral filter $\mathbf{23}_2$, and similarly for the other optical pathways of the system. Advantageously, lenses $\mathbf{21}_1$ and $\mathbf{21}_2$, as well as their counterparts in the other optical pathways of the system, may be formed from a single piece of transparent material, for example germanium, to form a first lens matrix 21. Similarly, the lenses $\mathbf{22}_1$ and $\mathbf{22}_2$, as well as their counterparts in the other optical pathways of the system, may be formed from a single other piece of transparent material, which may also be germanium, to form a second lens matrix 22. Such a design of all the optical pathways of the optical imaging system facilitates the optical alignment of the whole system, by virtue of the fact that the lenses are directly manufactured parallel to each other within each lens matrix. Preferably, the imaging matrix 2 is oriented so that its rows or columns of optical pathways are parallel to the rows of bolometers or microbolometers in the matrix image sensor 1.

The optical pathways are distinguished from one another by their respective spectral filters, which have transmission windows that are different from one another, all within the spectral sensitivity range of the matrix image sensor 1. These transmission windows of the spectral filters can be selected as a function of a gas to be sought to which the optical imaging system is dedicated. A person skilled in the art can then select the spectral filters depending on the absorption and transparency bands of the gas to be detected.

Each optical pathway combines a scene contained in the input optical field of the optical imaging system, which is common to all the optical pathways, with a respective portion of the matrix of the image sensor 1, called the useful zone of the matrix image sensor for this optical pathway. Thus, during each reading sequence, the matrix image sensor 1 simultaneously captures all the images of the scene that are formed in the useful zones by all the optical pathways. Such a multiple-pathway optical imaging system architecture is known in prior art under the acronym TOMBO, for "Thin Observation Module by Bound Optics".

Figure 2:
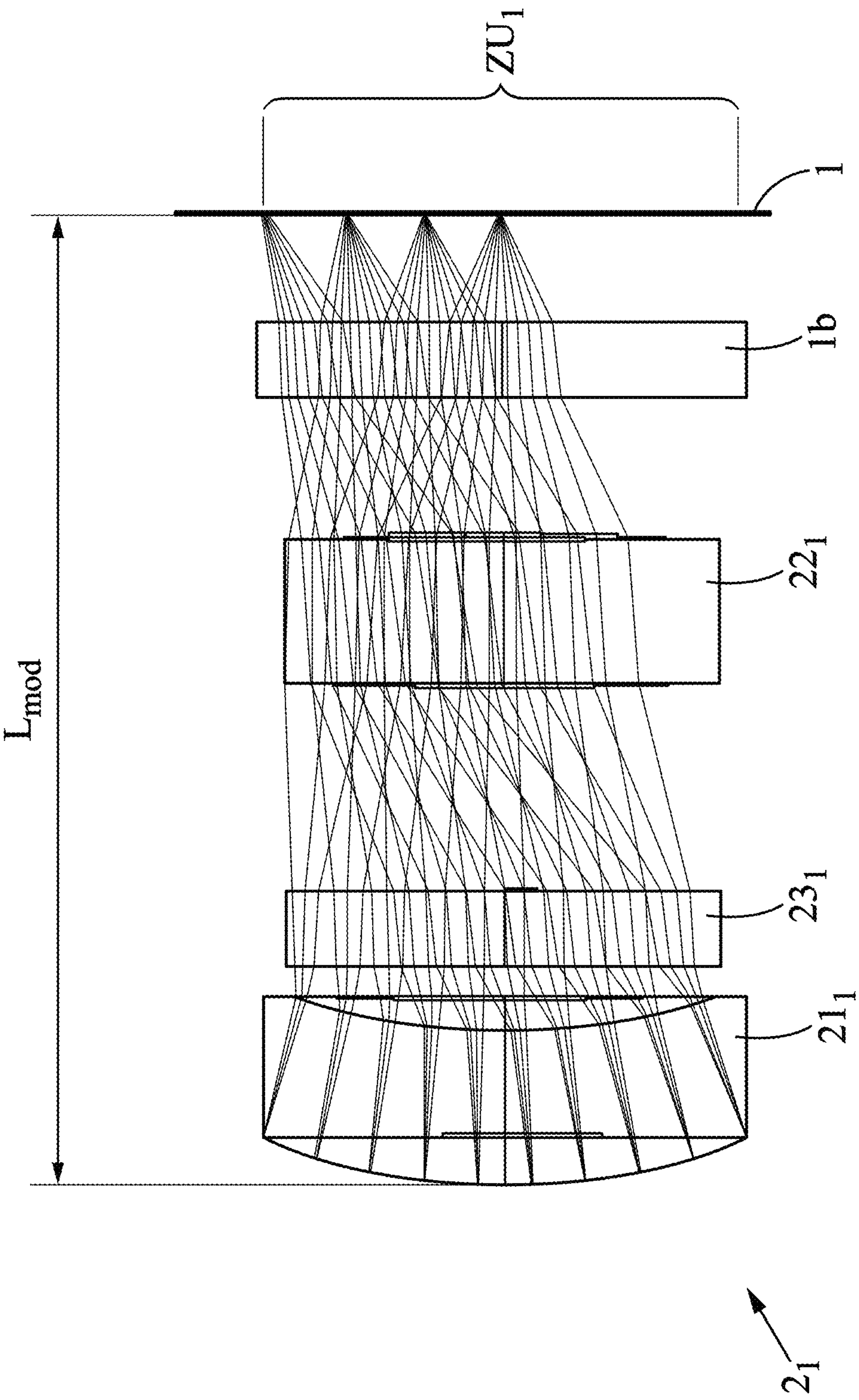
FIG. 2 shows useful light rays for an optical pathway of the optical imaging system of [FIG. 1]

FIG. 2 shows light rays which are transmitted by one of the optical pathways, for example optical pathway $\mathbf{2}_1$. The useful zone of the matrix image sensor 1 for each optical pathway may be 254 columns by 319 rows, for example, and two of the optical pathways that are neighbouring pathways to the imaging matrix 2 may be separated by 130 rows or columns of the image sensor matrix 1. $ZU_1$ designates the useful zone of optical pathway $\mathbf{2}_1$. For such an embodiment, all the optical pathways may have a length $L_{mod}$ in the order of 13 mm (millimetre), measured between the anterior face of the lens matrix 21 and the photosensitive surface of the matrix image sensor 1.

Figure 3:
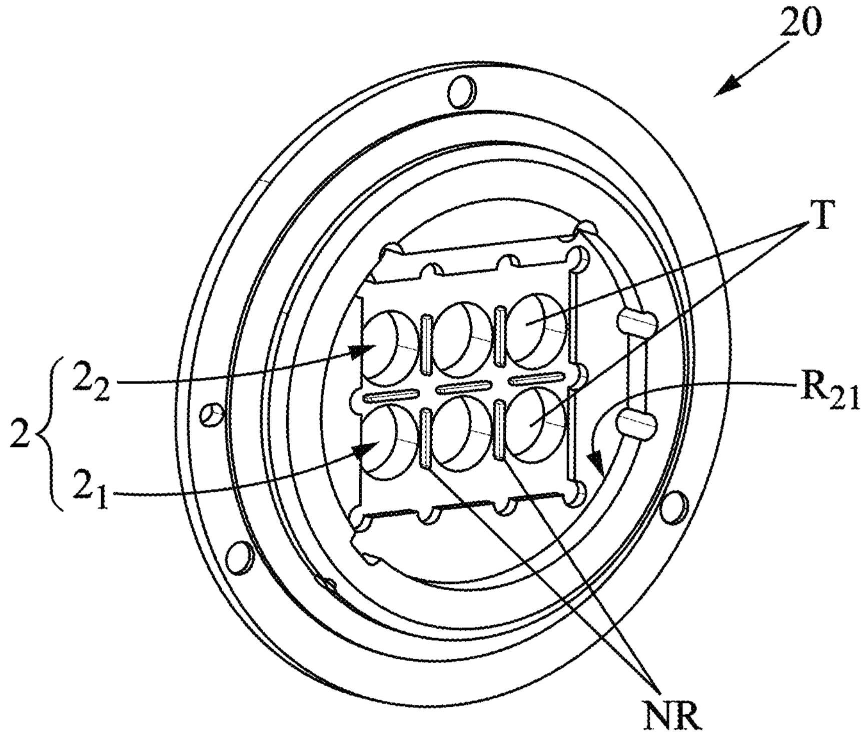
FIG. 3 is a perspective view of an optical pathway assembly support, which can be used in the optical imaging system of [FIG. 1]

In particularly advantageous embodiments of the optical imaging system, some of the components of its optical pathways may be supported by an assembly support 20 common thereto, as indicated in [FIG. 1]. An example of such a support 20 is shown in [FIG. 3]. It is provided with holes T, for example cylindrical holes, which are assigned one by one to the optical pathways to allow light rays to pass up to the matrix image sensor 1. These holes T are separated from one another by portions of the material of the support 20, which is opaque for the spectral range of sensitivity of the matrix image sensor 1. These portions of opaque material constitute longitudinal separations between neighbouring optical pathways, i.e. separating walls. In this way, stray light that would be likely to pass from one optical pathway to a neighbouring optical pathway is eliminated. Finally, raised ribs NR can be provided on these separating walls, on one side of the support 20, to hold the respective spectral filters of the optical pathways in place. [FIG. 3] thus shows the support 20 from its side intended to face the scene to be analysed, i.e. from its side which is opposite to the matrix image sensor 1 within the system. The rim $R_{21}$ is intended to support the lens matrix 21, and a similar rim $R_{22}$ is provided on the other side of the support 20 to support the lens matrix 22 in front of the matrix image sensor 1 (see [FIG. 1]). Wedging and centring systems within the knowledge of the person skilled in the art may be further provided to press the lens matrices 21 and 22 against the support 20, at the edges $R_{21}$ and $R_{22}$ respectively.

Figure 4:
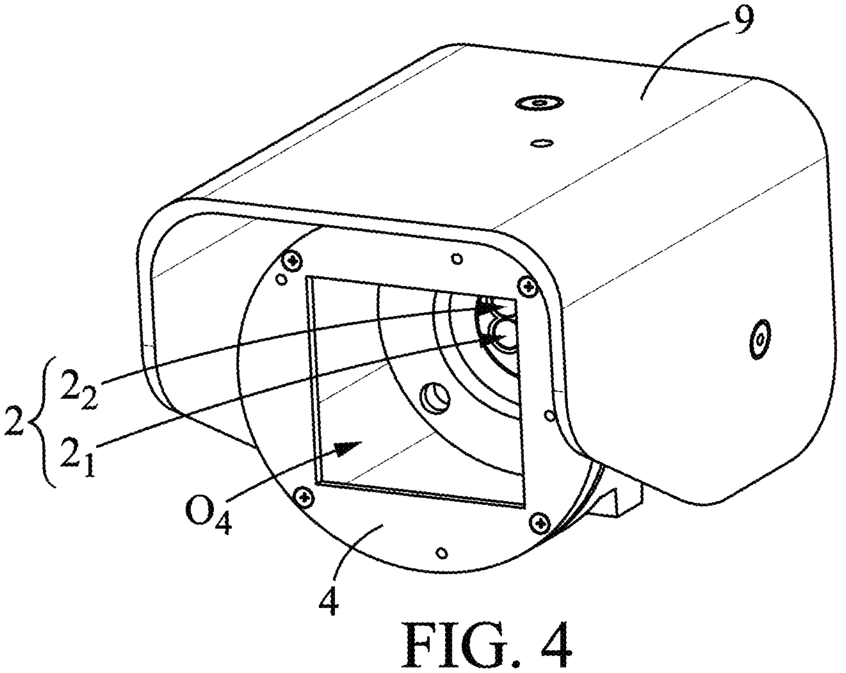
FIG. 4 is an external perspective view of the optical imaging system of [FIG. 1]

The support 20 and the baffle 4 are visible in [FIG. 1] and [FIG. 4]. The baffle 4 has a single entrance aperture $O_4$ which is common to all the optical pathways, and through which light rays enter the system for all these optical pathways, until they reach the useful zone which separately corresponds to each of them on the matrix image sensor 1. Advantageously, the optical imaging system can be protected at the top thereof by a thermal screen 9, commonly known as a cap, to avoid undergoing inhomogeneous thermal variations caused by temporary exposure to solar radiation or cold air streams. Indeed, as will become apparent later, the thermal compensation device 3 which used within the optical imaging system requires the temperature to be substantially homogeneous and stabilised within the system in order to correctly operate.

The athermalisation function of the thermal compensation device 3 is to keep sharpness of the images captured by the matrix image sensor 1 when the system temperature varies. For this, the thermal compensation device 3 causes variations in the distance between an optical centre of the imaging matrix 2 and the matrix image sensor 1 as a function of the system temperature. This distance is the focal length of the imaging matrix 2, denoted f, and its variations as a function of temperature are approximately given by the formula known to the person skilled in the art:

$$\Delta f = \left(\alpha - \frac{1}{n-1} \cdot \frac{dn}{dT}\right) \cdot \Delta T \cdot f$$

where α is the thermal expansion coefficient of the material of the lens matrices 21 and 22, i.e. germanium in this case, n is the optical refractive index of this material, and T is the temperature of the optical imaging system. The factor in brackets is commonly referred to as the thermo-optic coefficient and is denoted β. [FIG. 5*a*] shows the focal length f of the optical imaging system that is the subject of this detailed description. In this figure, the imaging matrix 2 is replaced with a single matrix of lenses, each equivalent to the optical doublet of the corresponding optical pathway. The plane of this figure is perpendicular to that of [FIG. 1].

Figure 5A:
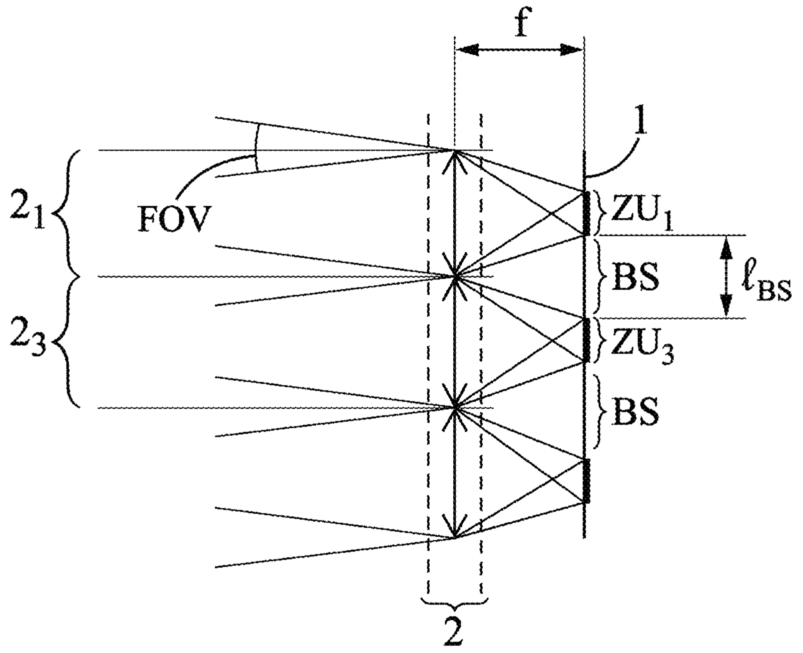
FIG. 5*a* shows several optical pathways of the optical imaging system of [FIG. 1], which are juxtaposed in a longitudinal cross-sectional plane.
Figure 5B:
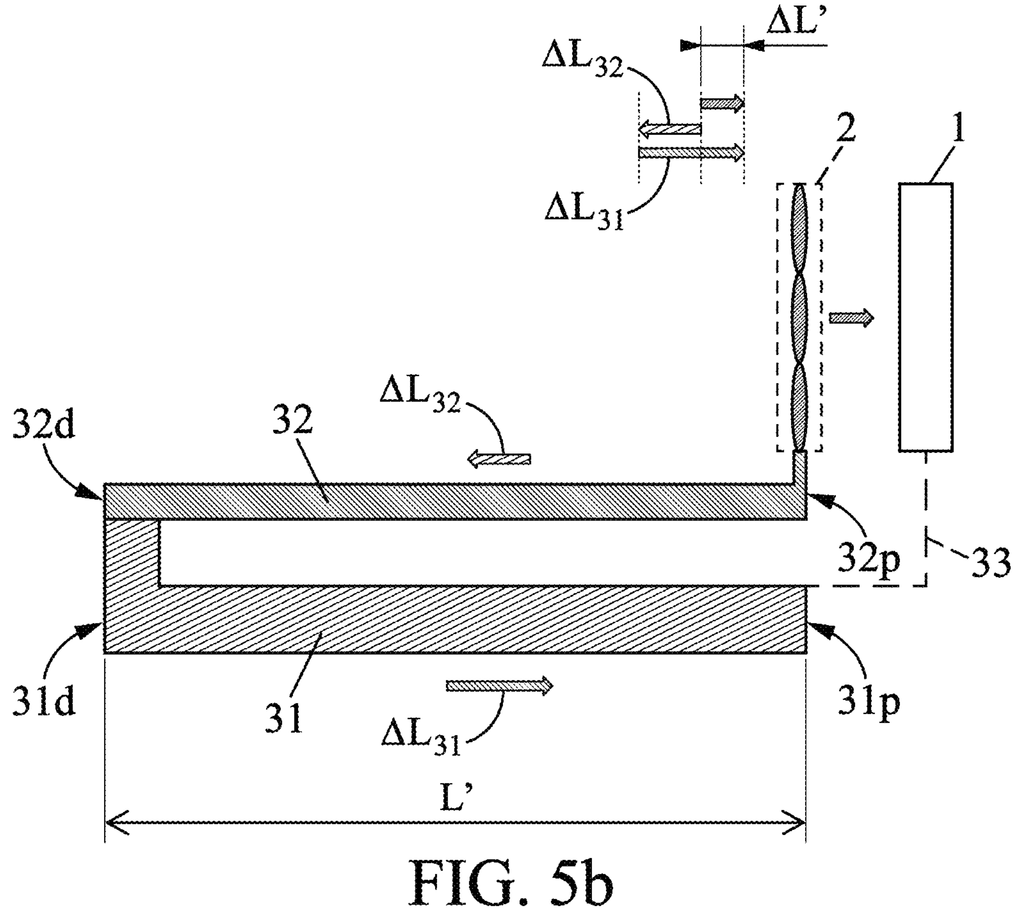
FIG. 5*b* shows thermal and geometrical dimensioning parameters of the optical imaging system of [FIG. 1], in the longitudinal cross-sectional plane of [FIG. 5*a*]

The configuration of the thermal compensation device 3 used by the invention is represented in [FIG. 5*b*]. In the plane of this figure, which is the same longitudinal cross-sectional plane of the system as that of [FIG. 5*a*], perpendicular to both the imaging matrix 2 and the matrix image sensor 1, the thermal compensation device 3 has a meander shape that extends upstream of the imaging matrix 2, i.e. on a side thereof that is opposite to the matrix image sensor 1. It comprises two segments 31 and 32 which are each made of a different material to that of the other segment, with a difference between the respective thermal expansion coefficient values of these two materials which is non-zero and noted ΔCTE. In a simplified approach, the two segments 31 and 32 are parallel to each other, with a common length which is noted L'. The respective proximal ends of the two segments 31 and 32 are not directly connected to each other. The proximal end 31*p* of segment 31 is connected to the matrix image sensor 1 by an intermediate piece 33 whose thermal variations could be neglected. The proximal end 32*p* of segment 32 is connected to the support 20 of the imaging matrix 2. The two segments 31 and 32 extend upstream of the imaging matrix 2, or in front of it opposite to the matrix image sensor 1, as represented in [FIG. 5*b*], and their respective distal ends, noted 31*d* and 32*d* are connected to each other. When the thermal compensation device 3 has such a configuration, the thermal variation it produces for the separation distance between the imaging matrix 2 and the matrix image sensor 1 is:

$$\Delta L' = \Delta CTE \cdot \Delta T \cdot L'$$

The inset in [FIG. 5*b*] shows the thermal variation of distance L' as the difference between the respective length variations $\Delta L_{31}$ and $\Delta L_{32}$ of the two segments 31 and 32: $\Delta L' = \Delta L_{31} - \Delta L_{32}$.

The thermal compensation device 3 is effective in keeping the images captured by the sensor 1 sharp when the system temperature varies, i.e. for the athermalisation function, if ΔL'=Δf. Two parameters for dimensioning the device 3 are available to satisfy this condition: L' and ΔCTE. When they are thus chosen, i.e. when the following condition is satisfied:

$$L' = \frac{\beta \cdot f}{\Delta CTE}$$

the optical imaging system is said to be athermalised and the previous condition is called the athermalisation condition. The thermal interval of use of the system as prescribed by its manufacturer, and which has been called the prescription interval of the optical imaging system in the general part of this description, is thus extended in comparison with a system without a thermal compensation device. The thermal compensation device 3 just described is often referred to as a passive device, as it does not use an active component—such as a user-controlled motor or drive—to adjust distance between the imaging matrix 2 and the matrix image sensor 1. The previous athermalisation condition leaves one parameter of the thermal compensation device 3 that is still available to produce an additional function: the difference in thermal expansion coefficient values ΔCTE. This additional function will be to support the baffle 4, preferably at the distal ends 31*d* and 32*d*.

The distance that is thus variable, for the athermalisation function, between the matrix image sensor 1 and the imaging matrix 2, as well as the presence of the window 1*b* between these two components, prevent providing longitudinal separating walls between the optical pathways that would extend from the imaging matrix 2 to the photosensitive surface of the matrix image sensor 1. The function of such separating walls, as known prior to the present invention, is to eliminate image overflows between neighbouring optical pathways which produce image overlaps. These image overlaps, also known as image superimpositions, occur at image edges that are parallel and neighbouring. For example, with reference to [FIG. 5*a*], the image which is formed by the optical pathway $\mathbf{2}_1$ thus overflows from the useful zone $ZU_1$ which is assigned to this optical pathway inside the matrix image sensor 1, into the useful zone $ZU_3$ which is assigned to the optical pathway 23 beyond the boundary between both useful zones. In the image overlap zone, the image information is mixed so that it can no longer be used, especially to detect the presence of a desired gas in the portions of the input optical field of the system that relate to these image overlaps. It is possible to separate useful zones of two neighbouring optical pathways by an intermediate band which is unused in the matrix of the matrix image sensor 1. Such a separation band is noted BS in [FIG. 5*a*], and has been referred to as a clearance band in the general part of this description. Thus, when at least one of the two images formed by the optical pathways $\mathbf{2}_1$ and $\mathbf{2}_3$ overflows into the separation band BS which is intermediate between the useful zones $ZU_1$ and $ZU_3$, this overflow does not directly impinges upon the other of these useful zones, as long as the overflow remains inside the separation band BS. Nevertheless, such separation bands are zones where the photosensitive surface of the matrix image sensor is not used, and the invention as described hereinafter makes it possible to reduce width of these separation bands BS, and therefore to reduce the number of photodetectors (pixels) of the matrix image sensor 1 that are not used.

According to the invention, images formed respectively by all the optical pathways on the matrix image sensor 1 are limited by the input aperture $O_4$ of the baffle 4, which is common to all these optical pathways. Preferably, this entrance aperture $O_4$ is centred with respect to the imaging matrix 2 and the matrix image sensor 1. The effectiveness of the baffle 4 in eliminating image overlaps is determined by the dimension of its entrance aperture $O_4$, and by the position of the edges of this aperture O4 in front of the imaging matrix 2. When each image is thus limited, useful zones can be brought closer together, so that the width of each separation band BS can be reduced. The number of photodetectors of the matrix image sensor 1 that are not used is thus reduced. In other words, this sensor has a higher utilisation rate of its photosensitive surface area.

Still according to the invention, the thermal compensation device 3 is further used to support the baffle 4. The remaining available parameter of the thermal compensation device 3, or one of its remaining available parameters when it includes more than two materials with different thermal expansion coefficient values, is then used to adjust the position of the baffle 4 in front of the imaging matrix 2. Such a selection for the parameter ΔCTE, in the continuation of the athermalisation of the optical imaging system that has been set forth earlier with reference to [FIG. 5*b*], is now described with reference to [FIG. 5*c*].

Figure 5C:
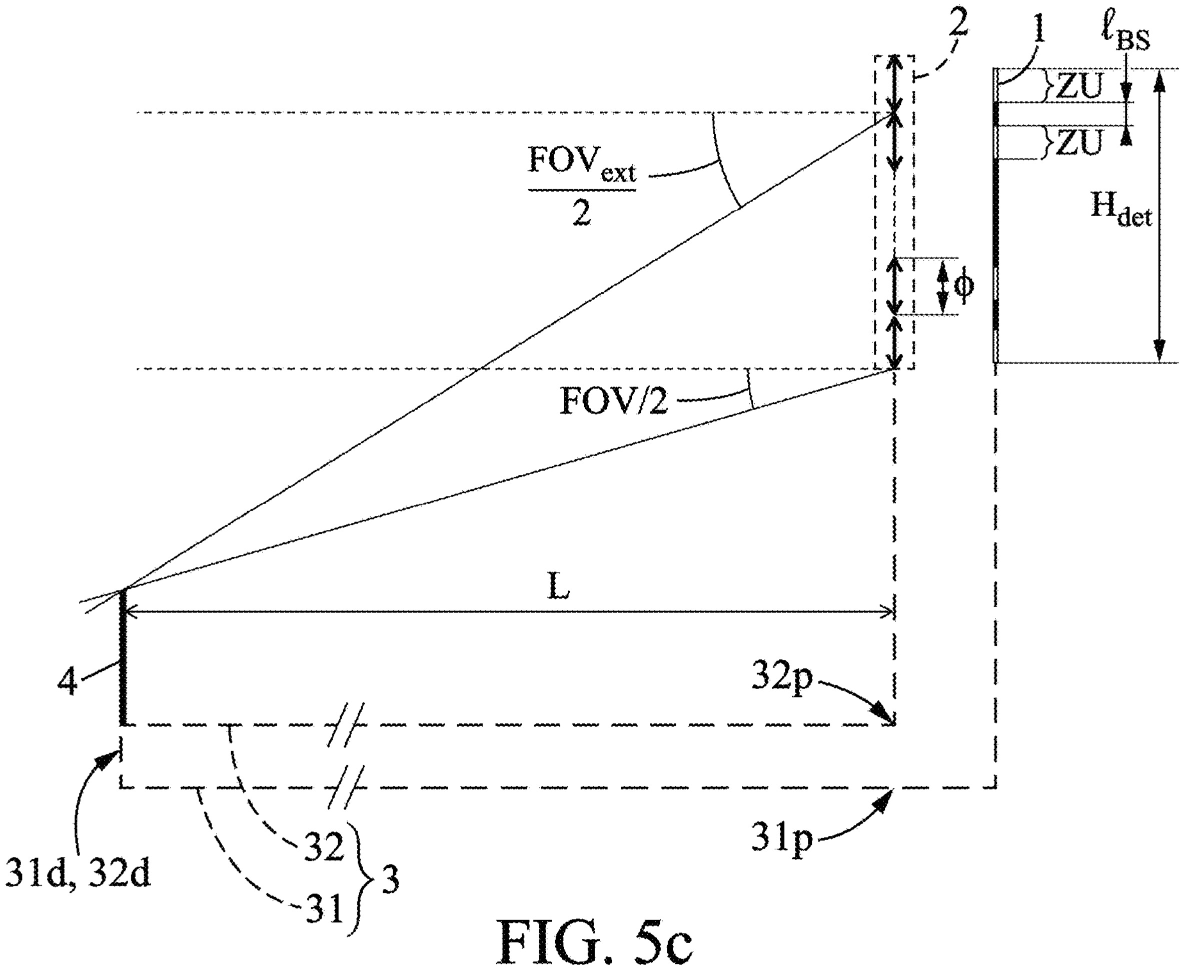
FIG. 5*c* corresponds to [FIG. 5*a*] to show optical and geometrical dimensioning parameters of the optical imaging system of [FIG. 1].

FIG. 5*c* is drawn in a longitudinal cross-sectional plane of the system that is parallel to the rows or columns of the imaging matrix 2, for example still the plane of [FIG. 5*a*] and [FIG. 5*b*]. It is assumed that the imaging matrix 2 has N optical pathways which are juxtaposed in this longitudinal cross-sectional plane, N being an integer greater than or equal to 2, preferably equal to 2 or 3, generally less than or equal to 4. Adopting the following notations:

$H_{det}$ for the size of the matrix image sensor 1 in the longitudinal cross-sectional plane, $I_{BS}$ for the width of the separation bands BS, assumed to be all equal to each other, and FOV for the useful field of view of the system for all the optical pathways in the longitudinal cross-sectional plane under consideration, the size of any useful zone ZU in this longitudinal cross-sectional plane is 2-f-tan (FOV/2), where tan (·) is the tangent function, and:

$$H_{det} = N \cdot 2 \cdot f \cdot \tan\left(\frac{FOV}{2}\right) + (N-1) \cdot l_{BS}$$

The useful field of view FOV is common to all the optical pathways, and an image of its content is separately formed by each optical pathway in the useful zone ZU of the matrix image sensor 1, which is dedicated to that optical pathway.

The image overlap is most critical between the first two or the last two useful zones of the matrix image sensor 1, counting the useful zones inside the longitudinal cross-sectional plane under consideration, progressively from one edge of the sensor 1 to its opposite edge. Stated differently, image overlaps first occur between the first two optical pathways or between the $(N-1)^{th}$ and Nth optical pathways. Denoting $FOV_{ext}$ the extreme field of view of the second optical pathway, which defines the maximum image overlap with the first optical pathway without overflowing the intermediate separation band in the useful zone of this first optical pathway, or by symmetry the extreme field of view of the $(N-1)^{th}$ optical pathway, which defines the maximum image overlap with the $N^{th}$ optical pathway, it follows from [FIG. 5*c*]:

$$L = \frac{(N-1)\Phi}{\tan\left(\frac{FOV_{ext}}{2}\right) - \tan\left(\frac{FOV}{2}\right)}$$

where L is the distance in front of the imaging matrix 2 at which the baffle 4 is located, and Φ is an individual pupillary diameter of the optical pathways, assumed to be identical for all the optical pathways. In an optimised embodiment of the optical imaging system, two optical pathways that are neighbouring pathways are assumed to be contiguous within the imaging matrix 2, i.e. the respective pupils of the optical pathways adjoin each other. At the same time, by definition of the extreme field of view $FOV_{ext}$, the following equation corresponds to the separation band BS between the first two or the last two useful zones ZU inside the longitudinal cross-sectional plane:

$$l_{BS} = f \cdot \left[\tan\left(\frac{FOV_{ext}}{2}\right) - \tan\left(\frac{FOV}{2}\right)\right]$$

Removing tan $(FOV_{ext}/2)$ between the two previous equations, and given that the pupil diameter Φ is equal to f/F # where F # is the aperture number in the system for each optical pathway, and additionally using the expression for $H_{det}$ which was given above, the result is:

$$L = \frac{(N-1) \cdot [H_{det} - (N-1) \cdot l_{BS}]^2}{F\# \cdot l_{BS} \cdot N^2 \cdot 4 \cdot \tan^2\left(\frac{FOV}{2}\right)}$$

This equation, which is purely optical and geometrical in nature, provides the distance L at which the baffle 4 has to be located in front of the imaging matrix 2 in order to avoid image overlaps inside useful zones of the matrix image sensor 1. It has been obtained for the overflow of the image formed by the second optical pathway into the useful zone of the first optical pathway.

In preferred embodiments of the invention which reduce the overall size of the complete system, the baffle 4 can be supported by the distal ends 31*d* and 32*d* of the segments 31 and 32 of the thermal compensation device 3 as represented in [FIG. 5*b*], these distal ends 31*d* and 32*d* being connected to each other. In other words: L=L'. Then, the remaining available parameter ΔCTE is given by the equation:

$$\frac{(N-1) \cdot [H_{det} - (N-1) \cdot l_{BS}]}{F\# \cdot l_{BS} \cdot N \cdot 2 \cdot \tan\left(\frac{FOV}{2}\right)} = \frac{1}{\Delta CTE} \cdot \left(\alpha - \frac{1}{n-1} \cdot \frac{dn}{dT}\right)$$

Under these conditions, the length of the thermal compensation device 3 in front of the imaging matrix 2 corresponds to the position for the baffle 4 in order to eliminate image overlaps in the useful zones. The optical imaging system with several optical pathways is therefore as compact as possible.

By way of example, the following numerical values can be adopted:

the matrix image sensor 1 can have a dimension of 1024 columns by 768 rows, with a row and column pitch equal to 17 μm, corresponding to a sensor size of Hdet=17.4 mm (millimetre) by 13.1 mm;

three optical pathways can be juxtaposed along the length of this matrix image sensor 1: N=3;

each separation band BS can correspond to 130 adjacent columns of the matrix image sensor 1, corresponding to $I_{BS}$=2.21 mm;

the useful field of view FOV may be equal to 30° (degree) for each optical pathway;

the aperture number F # may also be equal to 1.2 for each optical pathway; and both lens matrices 21 and 22 may be made of germanium.

For these numerical values, the parameters for the thermal compensation device 3 are L=L'=40 mm and ΔCTE=20.5 $\mu m \cdot m^{-1} \cdot {}^{\circ} C.^{-1}$. This value for ΔCTE can be obtained by using aluminium and the alloy that is commercially designated Invar®, separately for each of the two segments 31 and 32 of the thermal compensation device 3. The quotient L/f of the distance L to the focal length f is then equal to 5.6. Under these conditions, the prescription temperature interval can be from −40° C. to +60° C. In other embodiments, wherein one of the segments 31 and the other 32 is made of aluminium and the other of ABS (acrylonitrile butadiene styrene) polymer, the quotient L/f may be equal to 1.8.

It is reiterated that the mathematical model just set forth is simplified and is intended only to show the principle of the invention. The person skilled in the art will be able to perfect it to make it more accurate, taking specific details of the optical imaging system into account.

Furthermore, it is possible to place the baffle 4 at levels along the length of the thermal compensation device 3 which are different from that of the distal ends 31*d* and 32*d*. The use of the invention then results in values for the parameter ΔCTE which are different from that which results from the last equation above, but the deduction of these values is within the knowledge of the person skilled in the art once they have set the geometry of the thermal compensation device 3 with respect to the imaging matrix 2 and the baffle 4. Finally, the thermal compensation device 3 can be made up of more than two segments whose variations in length combine to produce athermalisation, while supporting the baffle 4 at an appropriate position to eliminate image overlaps inside the useful zones. Additional parameters are then available which may facilitate the use of the invention for particular applications.

Finally, it is understood that the invention can be reproduced by modifying yet further secondary aspects of the simplified embodiment that has been described in detail above, while retaining some at least of the advantages cited. Especially, an optical imaging system in accordance with the invention may be used in applications other than the search for one or more gases in an environment. Furthermore, all the numerical values have been cited by way of illustration only, and may be changed depending on the application under consideration.

The invention claimed is:

1. An optical imaging system comprising several optical pathways arranged in parallel, and for operation when a temperature of the system is included in a prescription interval, said system comprising:

a matrix image sensor; and an imaging matrix, comprising several imaging optics which are disposed in parallel and adapted to form simultaneously, in useful zones of the matrix image sensor which are dedicated one-to-one to the imaging optics, respective images of a scene contained in an input optical field which is identical for all said imaging optics, the useful zones of the image sensor being disjoint and each imaging optic with the corresponding useful zone belonging to one of the optical pathways of the system separately from each other optical pathway;

a thermal compensation device, disposed to produce a variable spacing between the imaging matrix and the matrix image sensor, and comprising, in at least one longitudinal cross-sectional plane which is perpendicular to the imaging matrix and to the matrix image sensor, a meander comprised of two segments each comprising a material whose thermal expansion coefficient value is different from that for the other segment, the two segments being connected to each other by respective distal ends of said segments, a proximal end of one of the segments being connected to the imaging matrix and a proximal end of the other of the segments being connected to the matrix image sensor, a difference between said thermal expansion coefficient values and respective lengths of the two segments being adapted to produce the variable spacing between the imaging matrix and the matrix image sensor so that images formed in the useful zones of said matrix image sensor are sharp when the temperature of the system has any value inside the prescription interval; and a baffle, disposed upstream of the imaging matrix with respect to a direction of propagation of a radiation that enters the system to form images, the baffle having an aperture for the radiation that is common to the optical pathways of the system, and the aperture of the baffle is dimensioned to laterally limit lighting in each image which is formed by any of the optical pathways, referred to as the optical pathway under consideration, in order to avoid said image overflowing into the useful zone of another of the optical pathways, next to said optical pathway under consideration, thus preventing any superimposition of images in all the useful zones, for any value of the temperature of the system in the prescription interval, and the distal ends of the segments of the thermal compensation device are located upstream of the imaging matrix with respect to the direction of propagation of the radiation which enters the system to form images, and the baffle is supported by the thermal compensation device upstream of the imaging matrix, also with respect to the direction of propagation of the radiation entering the system to form images.

2. The optical imaging system according to claim 1, wherein the baffle is supported by the thermal compensation device at the distal ends of the segments of said thermal compensation device.

3. The optical imaging system according to claim 1, wherein a separation distance between the baffle and the imaging matrix, measured in parallel to a common direction of respective optical axes of the imaging optics, is between 1.0 times and 6.0 times a mean value of the focal lengths of the imaging optics.

4. The optical imaging system according to claim 1, further comprising an enclosure which is disposed to contain the matrix image sensor, said enclosure being provided with a window which is transparent to the radiation which forms images, and which is located between the imaging matrix and the matrix image sensor.

5. The optical imaging system according to claim 1, wherein the imaging optics have a row and column arrangement in the imaging matrix, each row being perpendicular to each column, and the imaging matrix is oriented such that each row of imaging optics is parallel to a row or column direction of photodetectors of the matrix image sensor.

6. The optical imaging system according to claim 5, wherein the row and column arrangement of the imaging optics in the imaging matrix is of one of the following dimensions: 1×2, 2×1, 2×2, 2×3, 3×2, 3×3, 2×4, 4×2, 3×4, 4×3 and 4×4.

7. The optical imaging system according to claim 1, wherein each optical imaging system comprises at least one germanium-based lens.

8. The optical imaging system according to claim 1, wherein each imaging optic comprises a spectral filter, and the spectral filters of two of the imaging optics that are distinct in the imaging matrix determine spectral transmission windows that are different.

9. A method for capturing several images associated with an input optical field which is identical for all said images, the method being implemented using an optical imaging system which is in accordance with claim 1.

10. The method according to claim 9, which is intended to reveal presence of a gas inside the input optical field, and wherein the optical imaging system is in accordance with claim 8, the spectral filters being selected such that the spectral transmission window of at least one of the spectral filters is in a transparency band of the gas, and the spectral transmission window of at least one other of said spectral filters is in an absorption band of said gas.

11. The method according to claim 9, wherein the gas is natural gas, or a hydrocarbon gas, or a toxic gas, or a greenhouse gas.

* * * * *